United States Patent
Jun et al.

(10) Patent No.: US 9,115,979 B2
(45) Date of Patent: Aug. 25, 2015

(54) WEB THICKNESS MEASURING EQUIPMENT AND METHOD OF MEASURING THICKNESS OF A WEB

(71) Applicant: SAMSUNG SDI CO., LTD., Yongin-si, Gyeonggi-do (KR)

(72) Inventors: Pilgoo Jun, Yongin-si (KR); Youngcheol Sim, Yongin-si (KR); Cheolhong Kim, Yongin-si (KR); Junsub Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 164 days.

(21) Appl. No.: 13/764,689

(22) Filed: Feb. 11, 2013

(65) Prior Publication Data

US 2014/0028999 A1 Jan. 30, 2014

(30) Foreign Application Priority Data

Jul. 24, 2012 (KR) .................... 10-2012-0080637

(51) Int. Cl.
*G01N 21/84* (2006.01)
*G01B 7/06* (2006.01)
(Continued)

(52) U.S. Cl.
CPC ............ *G01B 7/107* (2013.01); *G01B 11/0691* (2013.01); *G01B 11/026* (2013.01); *G01B 11/0608* (2013.01)

(58) Field of Classification Search
CPC ............ G01B 7/107; G01B 7/10; G01B 7/06; G01B 7/02; G01B 7/023; G01B 11/02; G01B 11/026; G01B 11/06; G01B 11/0608; G01B 11/0691
USPC ............ 356/72, 73, 429, 430, 431, 625–640, 356/559.27
See application file for complete search history.

(56) References Cited

U.S. PATENT DOCUMENTS 5,075,622 A * 12/1991 Konii et al. .................... 324/229
5,355,083 A * 10/1994 George et al. ................. 324/229

(Continued)

FOREIGN PATENT DOCUMENTS

JP 9-49725 2/1997
JP 09049725 * 2/1997 ............. G01B 21/08

(Continued)

OTHER PUBLICATIONS

Patent Abstracts of Japan and Machine English Translation of JP 9-49725 (20 sheets).

(Continued)

*Primary Examiner* — Tarifur Chowdhury
*Assistant Examiner* — Michael P Lapage
(74) *Attorney, Agent, or Firm* — Christie, Parker & Hale, LLP

(57) ABSTRACT

A web thickness measuring equipment and a method of measuring a web thickness. A web thickness measuring equipment includes: a roller that is rotatable and configured to wind a web; a detection unit that detects a light amount on an outer circumferential surface of the roller or an external surface of the web wound on the roller, and detects a magnetic field of an internal surface of the web opposite to the external surface; and a processor unit configured to obtain a thickness of the web by generating profile data of the outer circumferential surface of the roller, generating displacement amount data of a target external surface of the web, generating displacement amount data of a target internal surface of the web, and comparing the displacement amount data of the target external surface of the web with the displacement amount data of the target internal surface of the web.

14 Claims, 8 Drawing Sheets

(51) Int. Cl.
*G01B 11/06* (2006.01)
*G01B 11/02* (2006.01)

(56) References Cited

U.S. PATENT DOCUMENTS

| | | | |
|---|---|---|---|
| 5,396,080 A * | 3/1995 | Hannotiau et al. | 250/559.28 |
| 6,120,833 A | 9/2000 | Bonnebat et al. | |
| 6,128,833 A * | 10/2000 | Juppi et al. | 34/464 |
| 6,281,679 B1 * | 8/2001 | King et al. | 324/229 |
| 6,967,726 B2 * | 11/2005 | King et al. | 356/630 |
| 2005/0000772 A1 * | 1/2005 | Wohner | 192/30 W |
| 2009/0059244 A1 * | 3/2009 | Hellstrom et al. | 356/630 |
| 2011/0260720 A1 * | 10/2011 | Fischer | 324/229 |
| 2012/0170059 A1 * | 7/2012 | Typpo et al. | 356/630 |

FOREIGN PATENT DOCUMENTS

| | | |
|---|---|---|
| JP | 10-82632 | 3/1998 |
| JP | 2008-114621 | 5/2008 |
| KR | 10-2000-0029934 | 5/2000 |
| KR | 10-1015593 B1 | 2/2011 |

OTHER PUBLICATIONS

Patent Abstracts of Japan and Machine English Translation of JP 10-82632 (14 sheets).

Korean Patent Abstracts for Korean Publication 10-2010-0044986 dated May 3, 2010, corresponding to Korean Patent 10-1015593 dated Feb. 17, 2011, listed above, (1 page).

* cited by examiner

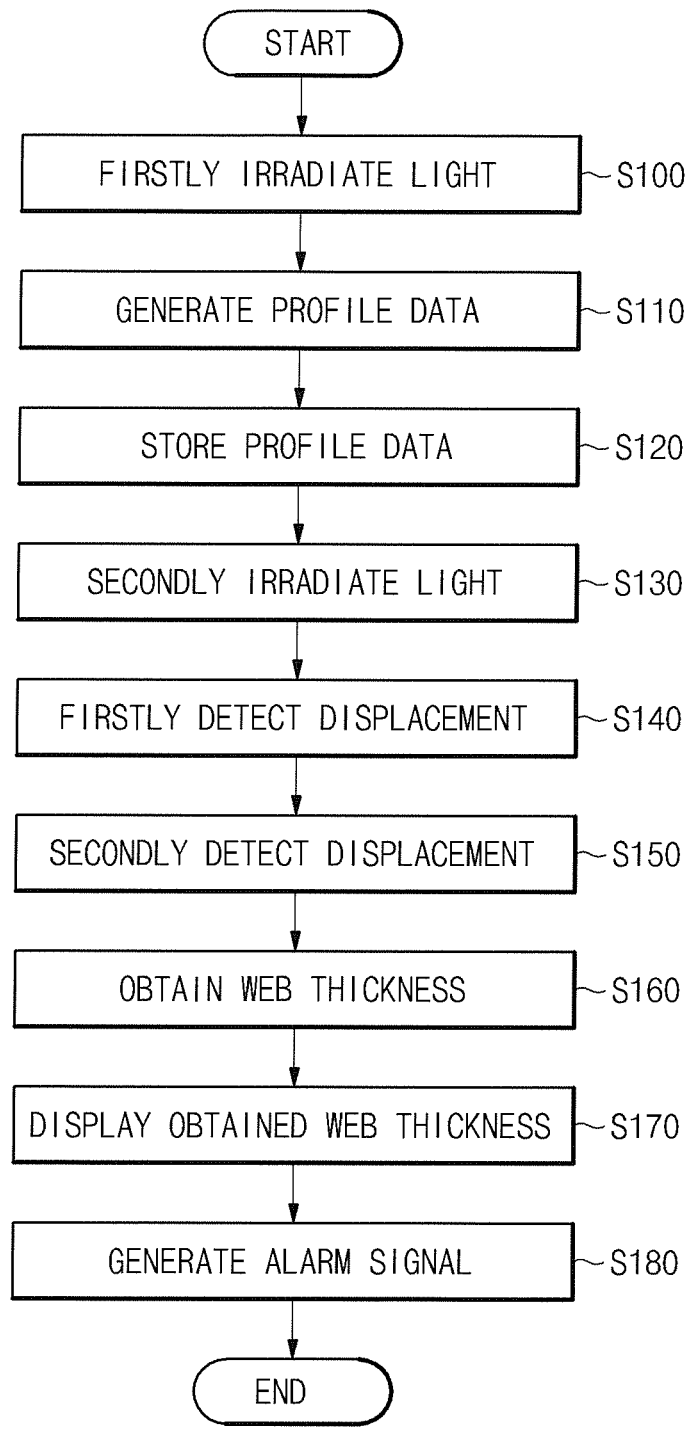

WEB THICKNESS MEASURING EQUIPMENT AND METHOD OF MEASURING THICKNESS OF A WEB

CROSS-REFERENCE TO RELATED APPLICATION

This application claims priority to and the benefit of Korean Patent Application No. 10-2012-0080637, filed on Jul. 24, 2012 in the Korean Intellectual Property Office, the entire content of which is incorporated herein by reference.

BACKGROUND

1. Field

Aspects of embodiments of the present invention relate to a web thickness measuring equipment and a method of measuring a web thickness.

2. Description of the Related Art

As development and demand for mobile techniques has recently increased, demand for a rechargeable battery as an energy source is rapidly increasing. Accordingly, research into batteries satisfying various requirements is underway. Particularly, a lithium secondary battery that has high energy density, discharge voltage, and output stability is increasingly demanded.

In general, a secondary battery is manufactured by forming each of a positive electrode plate and a negative electrode plate (referred to herein as a positive web and a negative web) by coating an active material on a current collector, interposing a separator between the positive and negative webs to form an electrode assembly, mounting the electrode assembly in a prismatic metal can or a pouch-type case formed of an aluminum laminate sheet, and injecting or impregnating a liquid electrolyte into the electrode assembly or using a solid electrolyte.

In the manufacture of secondary batteries, it is important to manufacture as many batteries as possible while maintaining the same quality. Accordingly, it is important to reliably manage a thickness of a web formed with a current collector.

Conventionally, in manufacturing a web of a secondary battery, optical equipment is installed around the web wound on a roll and an image of the web is acquired from the optical equipment, thereby measuring the thickness of the web.

However, in the conventional web thickness measuring equipment, continuous use of a roll may result in deformation of the roll, and an error in measuring the thickness of the web may be generated. In addition, in view of characteristics of the web of the secondary battery, web thickness measurement may not be properly performed due to the pattern formed on the web wound on the roll.

SUMMARY

According to aspects of the present invention, a web thickness measuring equipment and a method of measuring web thickness have improved reliability of measured thickness data by improving a uniformity in web thickness measurement.

According to an embodiment of the present invention, a web thickness measuring equipment includes: a roller that is rotatable and configured to wind a web on the roller and move the web in a rotating direction of the roller; a detection unit that detects a light amount on an outer circumferential surface of the roller or an external surface of the web wound on the roller, and detects a magnetic field of an internal surface of the web opposite to the external surface; and a processor unit configured to obtain a thickness of the web by generating profile data of the outer circumferential surface of the roller using a light amount detection signal of the outer circumferential surface of the roller, generating displacement amount data of a target external surface of the web moving in real time using a light amount detection signal of the target external surface of the web, generating displacement amount data of a target internal surface of the web using a magnetic field detection signal of the target internal surface of the web, and comparing the displacement amount data of the target external surface of the web with the displacement amount data of the target internal surface of the web.

The detection unit may include: a light source unit that irradiates light to the outer circumferential surface of the roller and the external surface of the web; and an optical displacement sensor facing the light source unit, the roller positioned between the optical displacement sensor and the light source unit, the optical displacement sensor configured to detect in real time light amounts of the outer circumferential surface of the roller and the external surface of the web according to a light amount distribution change of the light irradiated from the light source unit and having passed through the outer circumferential surface of the roller and the external surface of the web, respectively.

The web thickness measuring equipment may further include a transfer frame on which the light source unit and the optical displacement sensor are installed, wherein the transfer frame moves in a lengthwise direction of the roller with respect to the outer circumferential surface of the roller or the target external surface of the web.

The detection unit may further include: a magnetic member that has magnetism and is arranged between the transfer frame and the web; and a Hall sensor on the transfer frame and configured to detect in real time a magnitude of a magnetic field between the target internal surface of the web and the magnetic member.

The processor unit may detect a change in the thickness of the web by comparing magnitudes of the magnetic field detected in real time by the Hall sensor.

The processor unit may include a memory unit that stores the profile data of the outer circumferential surface of the roller, receives the profile data of the outer circumferential surface of the roller from the memory unit, and generates the displacement amount data of the target external surface of the web and the displacement amount data of the target internal surface of the web based on the profile data of the outer circumferential surface of the roller.

The processor unit may include: an operator unit that obtains the thickness of the web; a display unit that displays the thickness of the web obtained by the operator unit to an outside of the processor unit; an alarm generation unit that generates an alarm signal when the thickness of the web obtained by the operator unit exceeds a reference thickness; a driving controller that controls rotation and movement of the roller, movement of the web, and driving of the detection unit; and a main controller that controls operations of the memory unit, the operator unit, the display unit, the alarm generation unit, and the driving controller.

The profile data of the outer circumferential surface of the roller may include position coordinate values of an entire outer circumferential surface of the roller.

The displacement amount data of the target external surface of the web may include position coordinate values of the target external surface of the web obtained based on the profile data of the outer circumferential surface of the roller, corresponding to the target external surface of the web.

The displacement amount data of the target internal surface of the web may include position coordinate values of the target internal surface of the web obtained based on the profile data of the outer circumferential surface of the roller, corresponding to the target internal surface of the web.

According to another embodiment of the present invention, a web thickness measuring equipment includes: a roller that is rotatable and configured to wind a web on the roller and move the web in a rotating direction of the roller; a detection unit that detects an image of an outer circumferential surface of the roller or an external surface of the web wound on the roller, and detects a magnetic field of an internal surface of the web opposite to the external surface; and a processor unit configured to obtain a thickness of the web by generating profile data of the outer circumferential surface of the roller using an image detection signal of the outer circumferential surface of the roller, generating displacement amount data of a target external surface of the web moving in real time using an image detection signal of the target external surface of the web, generating displacement amount data of a target internal surface of the web using a magnetic field detection signal of the target internal surface of the web, and comparing the displacement amount data of the target external surface of the web with the displacement amount data of the target internal surface of the web.

The detection unit may include: a light source unit that irradiates light to the outer circumferential surface of the roller and the external surface of the web; and an image acquisition sensor facing the light source unit, the image acquisition sensor configured to detect the light irradiated from the light source unit and having passed through the outer circumferential surface of the roller and the external surface of the web, and to detect in real time images of the outer circumferential surface of the roller and the external surface of the web.

The web thickness measuring equipment may further include a transfer frame on which the light source unit and the image acquisition sensor are installed, wherein the transfer frame moves in a lengthwise direction of the roller with respect to the outer circumferential surface of the roller or the target external surface of the web.

The detection unit may further include: a magnetic member that has magnetism and is arranged between the transfer frame and the web; and a Hall sensor on the transfer frame and configured to detect in real time a magnitude of a magnetic field between the target internal surface of the web and the magnetic member.

The processor unit may detect a change in the thickness of the web by comparing magnitudes of the magnetic field detected in real time by the Hall sensor.

The profile data of the outer circumferential surface of the roller may include position coordinate values of an entire outer circumferential surface of the roller.

The displacement amount data of the target external surface of the web may include position coordinate values of the target external surface of the web obtained based on the profile data of the outer circumferential surface of the roller, corresponding to the target external surface of the web.

The displacement amount data of the target internal surface of the web may include position coordinate values of the target internal surface of the web obtained based on the profile data of the outer circumferential surface of the roller, corresponding to the target internal surface of the web.

According to another embodiment of the present invention, a method of measuring a thickness of a web includes: firstly irradiating light to an outer circumferential surface of a roller; generating profile data of the outer circumferential surface of the roller according to a light amount distribution of the light having passed through the outer circumferential surface of the roller; storing the profile data of the outer circumferential surface of the roller; secondly irradiating light to a target external surface of the web wound around the outer circumferential surface of the roller and moving in real time; firstly detecting displacement amount data of the target external surface of the web based on the profile data of the outer circumferential surface of the roller according to a light amount distribution of the secondly irradiated light having passed through the target external surface of the web; detecting magnitudes of a magnetic field formed between a magnetic member spaced apart from the target external surface of the web and a target internal surface of the web opposite to the target external surface, and secondly detecting displacement amount data of the target internal surface using a magnetic field detection signal of the target internal surface based on the profile data of the outer circumferential surface of the roller; and obtaining the thickness of the web by comparing the displacement amount data of the target external surface of the web with the displacement amount data of the target internal surface.

The method may further include displaying the thickness of the web; and generating an alarm signal when the thickness of the web exceeds a reference thickness.

According to an aspect of embodiments of the present invention, in a web thickness measuring equipment and method of measuring web thickness, the reliability of measured thickness data is improved by improving a uniformity in web thickness measurement by generating profile data of the roller using a light amount detection signal of the roller outer circumferential surface on which the web is wound using optical equipment, generating displacement amount data of a target external surface of the web moving in real time, which is detected based on the profile data, and generating displacement amount data of a target internal surface of the web based on the profile data.

According to an aspect of embodiments of the present invention, in a web thickness measuring equipment and method of measuring web thickness, a change in the web thickness can be detected by comparing magnitudes of a magnetic field formed by a magnetic member and the web moving in real time, thereby easily detecting the change in the web thickness.

Additional aspects and/or advantages of the present invention are set forth in part in the description which follows and, in part, will be obvious from the description, or may be learned by practice of the invention.

BRIEF DESCRIPTION OF THE DRAWINGS

Aspects and advantages of the present invention will be more apparent from the following description of some exemplary embodiments of the present invention, taken in conjunction with the accompanying drawings, of which:

FIG. 7 is a flowchart illustrating a web thickness measuring method according to another embodiment of the present invention.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 1:
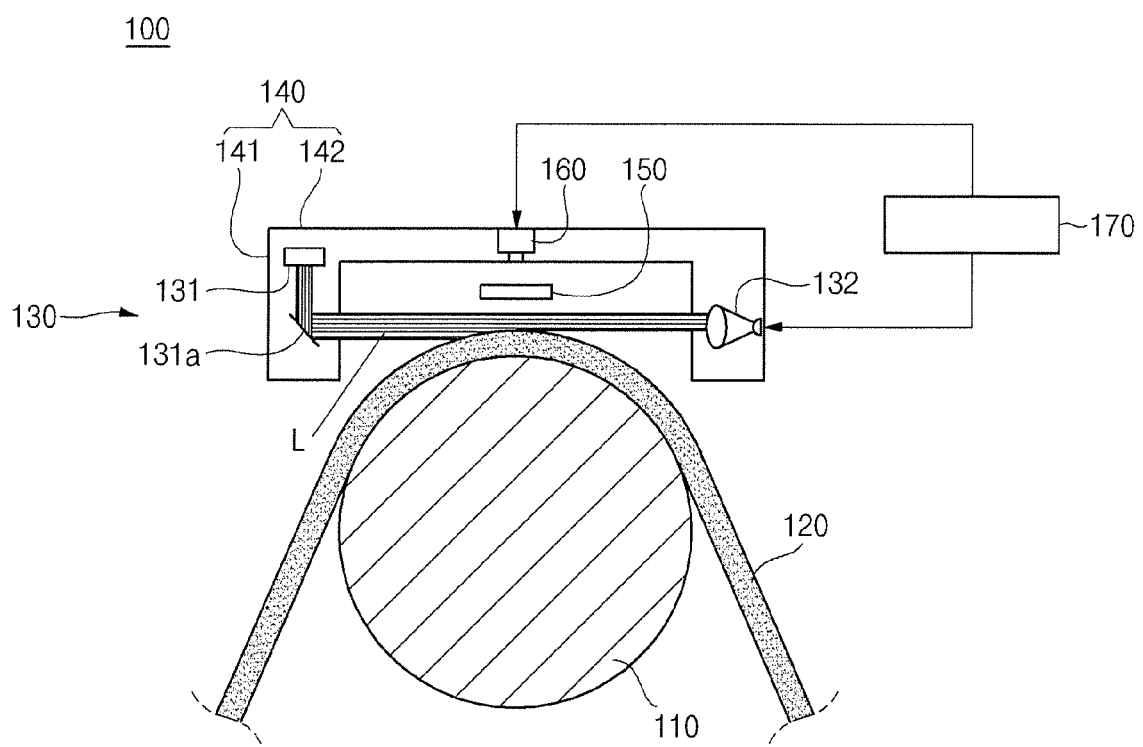
FIG. 1 is a schematic cross-sectional view of a web thickness measuring equipment according to an embodiment of the present invention.
Figure 2:
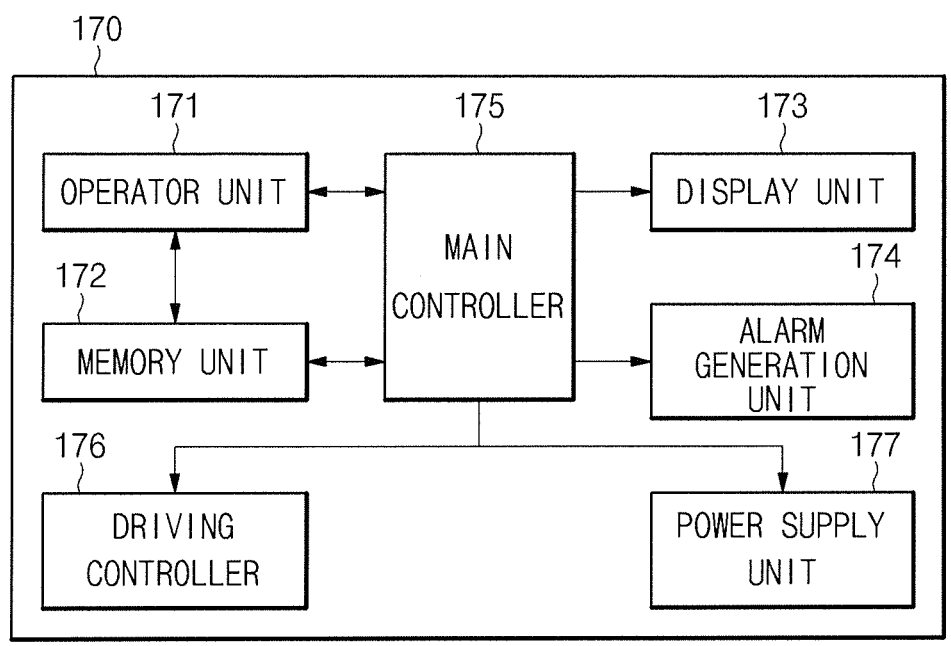
FIG. 2 is a block diagram of a configuration of a processor unit of the web thickness measuring equipment of FIG. 1, according to an embodiment of the present invention.
Figure 3A:
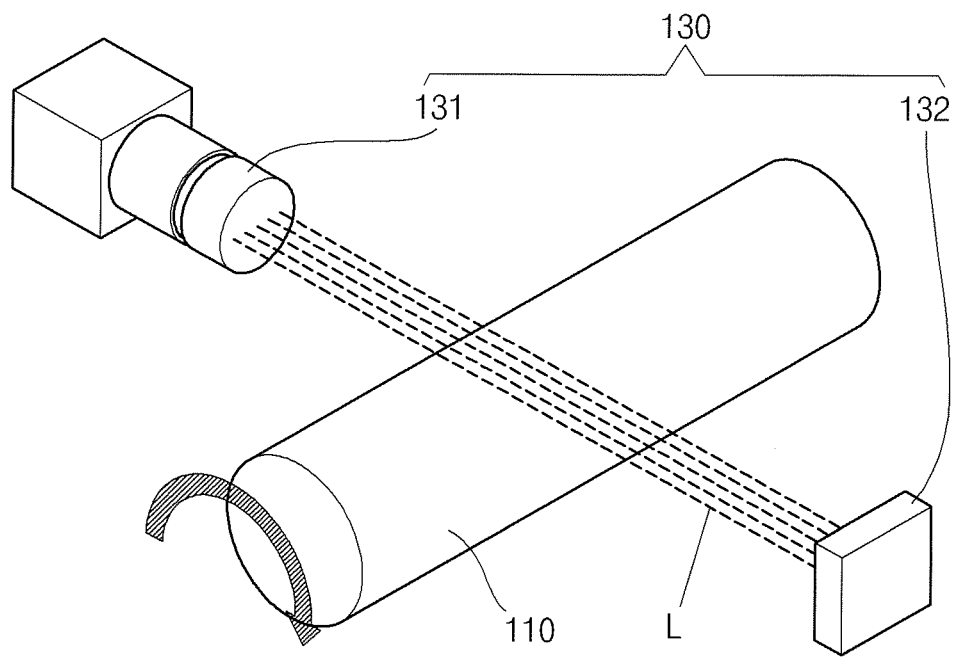
FIG. 3A is a schematic view showing an operation of detecting a light amount by irradiating light on an outer circumferential surface of a roller of the web thickness measuring equipment of FIG. 1, according to an embodiment of the present invention.
Figure 3B:
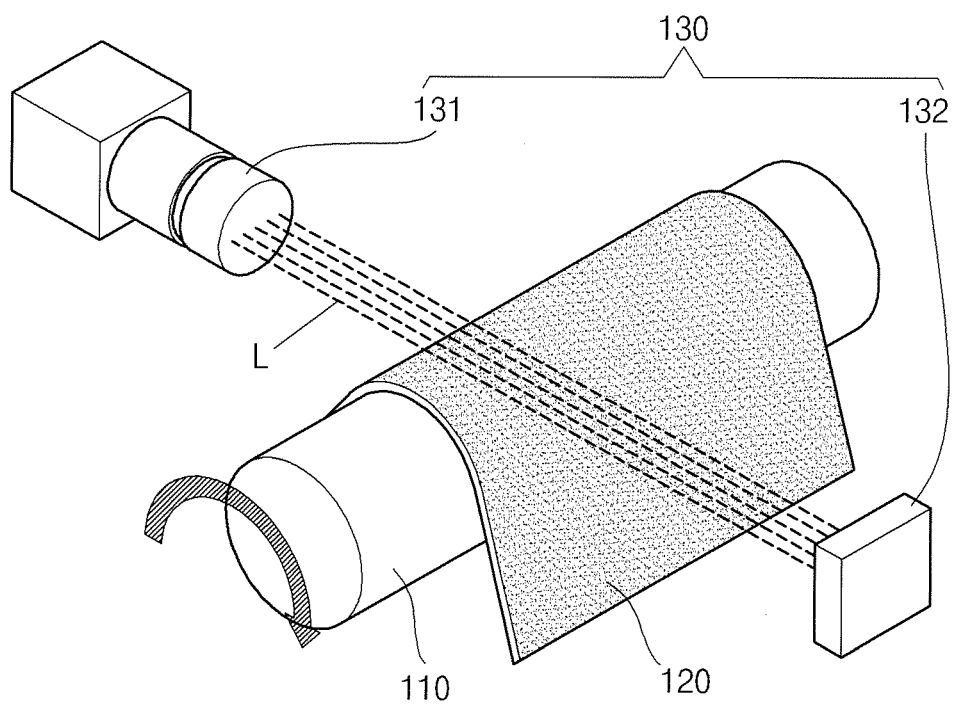
FIG. 3B is a schematic view showing an operation of detecting a light amount by irradiating light on an external surface of a web, according to an embodiment of the present invention.

FIG. 1 is a schematic cross-sectional view of a web thickness measuring equipment according to an embodiment of the present invention; FIG. 2 is a block diagram of a configuration of a processor unit of the web thickness measuring equipment of FIG. 1, according to an embodiment of the present invention; FIG. 3A is a schematic view showing an operation of detecting a light amount by irradiating light on an outer circumferential surface of a roller of the web thickness measuring equipment of FIG. 1, according to an embodiment of the present invention; and FIG. 3B is a schematic view showing an operation of detecting a light amount by irradiating light on an external surface of a web, according to an embodiment of the present invention.

Referring to FIGS. 1 to 3B, a web thickness measuring equipment 100 according to an embodiment of the present invention includes a roller 110, a web 120, a detection unit 130, and a processor unit 170.

The roller 110 is shaped as a cylinder and rotates about a center axis extending in a lengthwise direction of the roller 110. The center axis of the roller 110 is fixed to an external fixing means (not shown) such that an outer circumferential surface of the roller 110 becomes a reference surface. The web 120 is wound on the outer circumferential surface to stably move in a direction perpendicular to the lengthwise direction of the roller 110. In one embodiment, the roller 110 may be made of a metal such that the web 120 wound on the outer circumferential surface and moving in real time is prevented or substantially prevented from being deformed. However, according to embodiments of the present invention, a material of the roller 110 is not limited to a metal.

The web 120 is wound on the outer circumferential surface of the roller 110 and moves in the rotating direction of the roller 110. That is, the web 120 moves in a direction perpendicular to the lengthwise direction of the roller 110. The web 120 may move toward the roller 110 by an external web supplying means (not shown). The web 120 may be a positive web or a negative web formed by coating an active material on a current collector of the secondary battery, but the present invention is not limited to the use and kind of web as those described and illustrated herein.

The detection unit 130, in one embodiment, detects a light amount of the outer circumferential surface of the roller 110 or a target external surface of the web 120 wound on the roller 110. Here, the target external surface of the web 120 refers to a region of the external surface of the web 120, from which a light amount is to be detected by the detection unit 130. In addition, in one embodiment, the detection unit 130 detects a magnitude of a magnetic field of an internal surface opposite to the external surface of the web 120.

The detection unit 130, in one embodiment, includes a light source unit 131 and an optical displacement sensor 132. In one embodiment, the light source unit 131 and the optical displacement sensor 132 are installed on a transfer frame 140 to be positioned on a same axial line.

The light source unit 131 irradiates light L onto the outer circumferential surface of the roller 110 and the target external surface of the web 120. The light source unit 131 may include a reflection mirror 131a that can change a direction of the light L in various ways. The light L irradiated from the light source unit 131 may be visible light, near infrared ray, or infrared laser, for example, but the present invention is not limited thereto.

In one embodiment, the optical displacement sensor 132 is disposed to face the light source unit 131, and the roller 110 is positioned between the optical displacement sensor 132 and the light source unit 131. The optical displacement sensor 132 detects the light amounts of the outer circumferential surface of the roller 110 and the target external surface of the web 120 according to a light amount distribution change of the light L irradiated from the light source unit 131 and having passed through the outer circumferential surface of the roller 110 and the target external surface of the web 120. In one embodiment, the optical displacement sensor 132, including a light-receiving lens, in which some of the light having passed through the outer circumferential surface of the roller 110 is formed as a spot through the light-receiving lens, detects the amount of the light formed at the spot, and transmits a light amount detection signal in the form of voltage output to the processor unit 170. The optical displacement sensor 132 may make some of the light having passed through the target external surface of the web 120 formed as a spot through the light-receiving lens, detect the amount of the light formed at the spot, and transmit a light amount detection signal in the form of voltage output to the processor unit 170. The optical displacement sensor 132 may be a light amount sensor corresponding to the light source unit 131, but the present invention is not limited thereto. The operation of detecting the light by the optical displacement sensor 132 is well known and used in the related art, and therefore a detailed description thereof will be omitted.

The transfer frame 140, in one embodiment, includes two post units 141 in which the light source unit 131 and the optical displacement sensor 132 are installed to face each other, and a body unit 142 connecting the two post units 141. In one embodiment, the two post units 141 are installed to face each other such that the light source unit 131 and the optical displacement sensor 132 are fixedly installed on the same axial line. The body unit 142 may fixedly support the two post units 141 by connecting the two post units 141. The transfer frame 140 may move in the lengthwise direction of the roller 110 with respect to the outer circumferential surface of the roller 110 or the target external surface of the web 120.

In one embodiment, the detection unit 130 may further include a magnetic member 150 and a Hall sensor 160.

The magnetic member 150 may be disposed between the transfer frame 140 and the web 120. Although not shown, the magnetic member 150 may be fixed to the transfer frame 140 and may move in the lengthwise direction of the roller 110 along with the transfer frame 140.

The Hall sensor 160, in one embodiment, is installed in the body unit 142 of the transfer frame 140 and detects in real time the magnitude of a magnetic field formed between the target internal surface of the web 120 and the magnetic member 150. That is, the Hall sensor 160 detects the intensity of the magnetic field formed from the magnetic member 150 having magnetism to the target internal surface of the web 120. The intensity of the magnetic field may be measured as a variation in an internal resistance of the Hall sensor 160 and may vary according to a distance between the target internal surface of the web 120 and the magnetic member 150. That is, the intensity of the magnetic field, which is output as a magnetic field detection signal having a voltage output, decreases as the distance between the target internal surface of the web 120 and the magnetic member 150 is decreased and increases as the distance is increased (see FIGS. 5 and 6). The Hall sensor 160 detects the intensity of the magnetic field between the magnetic member 150 and the target internal surface of the web 120 moving in real time, which is output as the magnetic field detection signal, and transmits the magnetic field detection signal to the processor unit 170. The operation of detecting the magnetic field by the Hall sensor 160 is well known and used in the related art, and therefore a detailed description thereof will be omitted.

The processor unit 170 generates profile data of the outer circumferential surface of the roller 110 using a light amount detection signal of the outer circumferential surface of the roller 110. That is, while rotating the roller 110, the processor unit 170 generates the profile data of a partial or entire outer circumferential surface of the roller 110 using the light amount detection signal of the outer circumferential surface of the roller 110. In one embodiment, the profile data is an entire map data in the form of a plane map including a plurality of coordinate values, which is generated by partially or entirely mapping the light amount detection signal of the outer circumferential surface of the roller 110. That is, in one embodiment, the profile data may be position coordinate values of the entire outer circumferential surface of the roller 110.

In addition, in one embodiment, the processor unit 170 generates displacement amount data of the target external surface of the web 120 using the light amount detection signal detected from the target external surface of the web 120 moving in real time by the optical displacement sensor 132. The displacement amount data of the target external surface of the web 120 may include position coordinate values of the target external surface of the web 120 obtained based on the profile data of the outer circumferential surface of the roller 110 corresponding to the position of the target external surface of the web 120. The position coordinate values of the target external surface of the web 120 may include the profile data of the outer circumferential surface of the roller 110 corresponding to the position of the target external surface of the web 120 and output voltage values obtained using the light amount detection signal of the target external surface of the web 120. In one embodiment, the position coordinate values may be expressed including a periodic function (wt=$2\pi f$) based on the time (t) for which the web 120 moves.

In addition, in one embodiment, the processor unit 170 generates displacement amount data of the target external surface of the web 120 using the magnetic field detection signal detected between the magnetic member 150 and the target external surface of the web 120 by the Hall sensor 160. The displacement amount data of the target external surface of the web 120 may include position coordinate values of the target external surface of the web 120 obtained based on the profile data of the outer circumferential surface of the roller 110 corresponding to the position of the target external surface of the web 120. The position coordinate values of the target external surface of the web 120 may include the profile data of the outer circumferential surface of the roller 110 corresponding to the position of the target external surface of the web 120 and output voltage values obtained using the magnetic field detection signal of the target external surface of the web 120.

Therefore, according to an embodiment of the present invention, the processor unit 170 obtains the thickness of the web 120 by comparing the displacement amount data of the target external surface of the web 120 with the displacement amount data of the target internal surface of the web 120. The thickness of the web 120 is a difference between a position coordinate value of the target external surface of the web 120 and a position coordinate value of the target internal surface of the web 120.

In one embodiment, in order to implement the above-described operation, the processor unit 170 includes a memory unit 172, an operator unit 171, a display unit 173, an alarm generation unit 174, a driving controller 176, a main controller 175, and a power supply unit 177.

The memory unit 172 stores the profile data of the outer circumferential surface of the roller 110. In one embodiment, the profile data of the outer circumferential surface of the roller 110 is generated from the light amount detection signal of the outer circumferential surface of the roller 110 by the operator unit 171. In addition, the memory unit 172 may store coordinate value data of the detection unit 130 fixed to the transfer frame 140 as well as the profile data of the outer circumferential surface of the roller 110.

The operator unit 171 obtains the thickness of the web 120 by comparing the displacement amount data of the target external surface of the web 120 with the displacement amount data of the target internal surface of the web 120. The operator unit 171 may recognize accurate position coordinate values of the outer circumferential surface of the roller 110 based on the light amount detection signal from the optical displacement sensor 132 when the roller 110 rotates and may combine the recognized position coordinate values to produce one piece of profile data. In one embodiment, the operator unit 171 stores the profile data of the outer circumferential surface of the roller 110 in the memory unit 172. Next, the operator unit 171 receives the light amount detection signal of the target external surface of the web 120 moving in real time on the outer circumferential surface of the roller 110 and generates the displacement amount data of the target internal surface of the web 120 using the light amount detection signal based on the profile data of the outer circumferential surface of the roller 110 positioned corresponding to the target internal surface of the web 120. In addition, in one embodiment, the operator unit 171 receives the magnetic field detection signal detected between the magnetic member 150 and the target internal surface of the web 120 by the Hall sensor 160 and generates the displacement amount data of the target internal surface of the web 120 using the magnetic field detection signal based on the profile data of the outer circumferential surface of the roller 110 positioned corresponding to the target internal surface of the web 120. Next, the operator unit 171 obtains the thickness of the web 120 by comparing the displacement amount data of the target external surface of the web 120 with the displacement amount data of the target internal surface of the web 120. In one embodiment, the operator unit 171 may be configured as a personal computer (PC) or a programmable logic controller (PLC) so as to implement generation of the profile data of the outer circumferential surface of the roller 110 or operation of the thickness of the web 120 in a hardware or software manner.

The display unit 173, in one embodiment, displays the thickness of the web 120 obtained by the operator unit 171 to the outside. That is, the display unit 173 may display the thickness of the web 120 moving in real time to the outside in textual or graphical representation, thereby allowing a worker to easily detect a change in the thickness or deformation of the web 120.

The alarm generation unit 174, in one embodiment, generates an alarm signal when the web thickness obtained by the operator unit 171 exceeds a reference thickness (e.g., a predetermined reference thickness) of the web 120. In one embodiment, the alarm generation unit 174 compares the thickness of the web 120 obtained in real time with the reference thickness for flaw determination of the web 120, and when the thickness of the web 120 exceeds the reference thickness, the alarm generation unit 174 generates the alarm signal in the form of text or voice format, for example, to the outside, thereby allowing the worker to easily identify a change in the thickness or deformation of the web 120.

The driving controller 176 controls rotation and movement of the roller 110, movement of the web 120, and driving of the detection unit 130. In one embodiment, the driving controller 176 receives a command from the main controller 175, and at least one of rotates or moves the roller 110, moves the web 120, or drives the detection unit 130.

The main controller 175, in one embodiment, controls operations of the memory unit 172, the operator unit 171, the display unit 173, the alarm generation unit 174, and the driving controller 176. In addition, the main controller 175 may continuously manage the profile data of the outer circumferential surface of the roller 110 obtained by the operator unit 171. Accordingly, the main controller 175 may control the operator unit 171 when deformation of the roller 110 is expected or for a period (e.g., every predetermined period), thereby updating the profile data.

In one embodiment, the main controller 175 is connected to the power supply unit 177 and may control power to be supplied to components of the web thickness measurement equipment 100 through the power supply unit 177.

Figure 4:
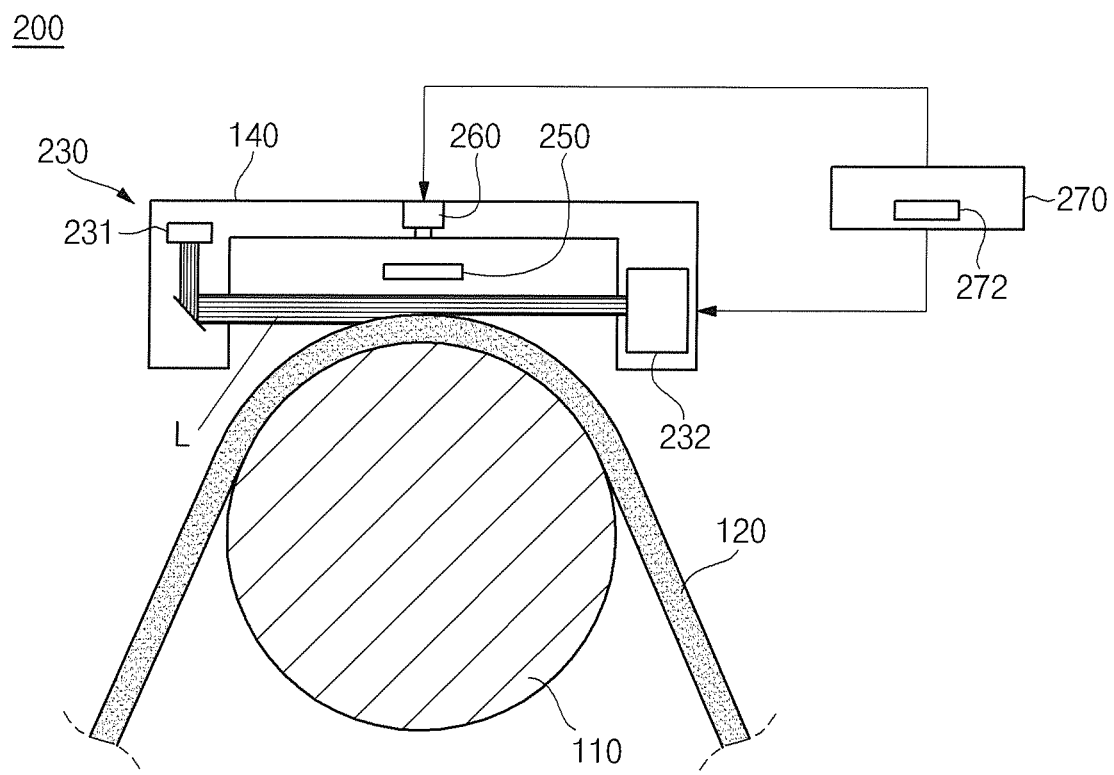
FIG. 4 is a schematic cross-sectional view of a web thickness measuring equipment according to another embodiment of the present invention.

FIG. 4 is a schematic cross-sectional view of a web thickness measuring equipment according to another embodiment of the present invention.

Referring to FIG. 4, a web thickness measuring equipment 200 according to another embodiment of the present invention includes the roller 110, the web 120, a detection unit 230, and a processor unit 270. The web thickness measuring equipment 200 shown in FIG. 4 differs from the web thickness measuring equipment 100 described above and shown in FIGS. 1 to 3B in that the detection unit 230 of the web thickness measuring equipment 200 includes an image acquisition sensor 232, instead of the optical displacement sensor 132 of the detection unit 130. The following description focuses on the detection unit 230 including the image acquisition sensor 232. In an embodiment of the web thickness measuring equipment 200 shown in FIG. 4, components that are the same as those of the embodiment of the web thickness measuring equipment 100 shown in FIGS. 1 to 3B are identified by the same reference numerals, and detailed descriptions thereof will not be repeated.

The detection unit 230, in one embodiment, detects in real time an image of the outer circumferential surface of the roller 110 or the target internal surface of the web 120 wound on the roller 110.

The detection unit 230, in one embodiment, includes a light source unit 231 and the image acquisition sensor 232. In one embodiment, the light source unit 231 and the image acquisition sensor 232 are installed on the transfer frame 140 to be positioned on a same axial line.

The light source unit 231 irradiates light L onto the outer circumferential surface of the roller 110 and the target external surface of the web 120.

The image acquisition sensor 232 may be disposed to face the light source unit 231 and detect the light L irradiated from the light source unit 231 and having passed through the outer circumferential surface of the roller 110 and the target external surface of the web 120 to detect in real time images of the outer circumferential surface of the roller 110 and the target external surface of the web 120.

The processor unit 270 generates profile data of the outer circumferential surface of the roller 110 using an image detection signal of the outer circumferential surface of the roller 110. In one embodiment, the profile data may include position coordinate values of the entire outer circumferential surface of the roller 110.

In addition, in one embodiment, the processor unit 270 generates displacement amount data of the target external surface of the web 120 using the image detection signal detected from the target external surface of the web 120 moving in real time by the image acquisition sensor 232.

In addition, in one embodiment, the processor unit 270 generates displacement amount data of the target internal surface of the web 120 using a magnetic field detection signal detected between a magnetic member 250 and the target internal surface of the web 120 by a Hall sensor 260.

In one embodiment, the processor unit 270 obtains the thickness of the web 120 by comparing the displacement amount data of the target external surface of the web 120 with the displacement amount data of the target internal surface of the web 120. In one embodiment, the profile data of the outer circumferential surface of the roller 110, generated by the processor unit 270, is stored in a memory unit 272.

Figure 5:
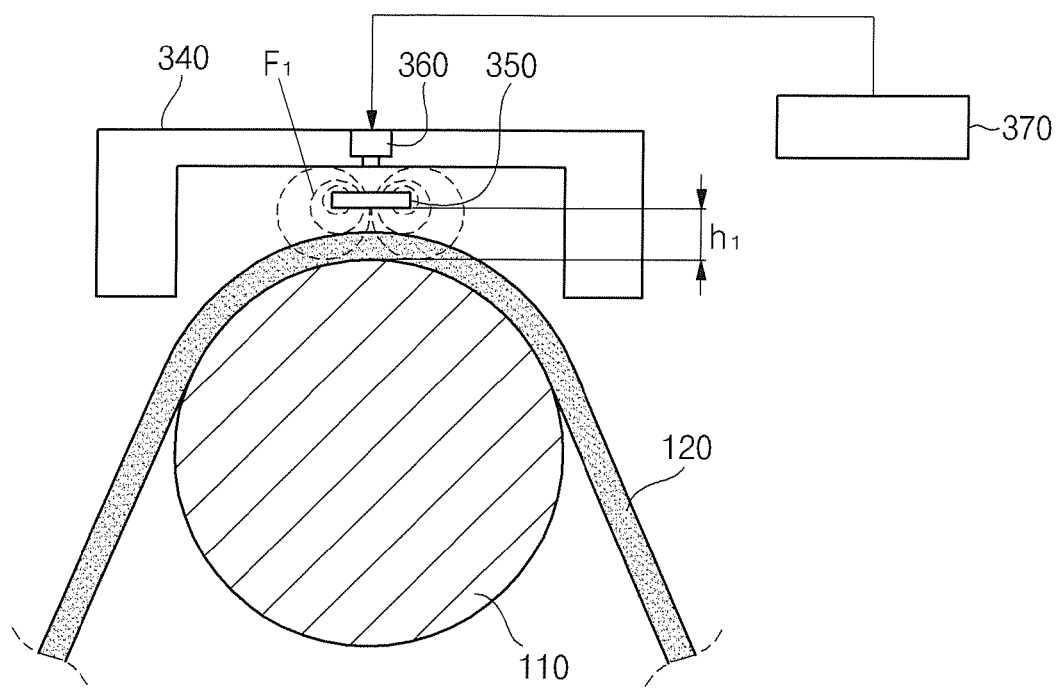
FIG. 5 is a schematic cross-sectional view of a web thickness measuring equipment according to another embodiment of the present invention.
Figure 6:
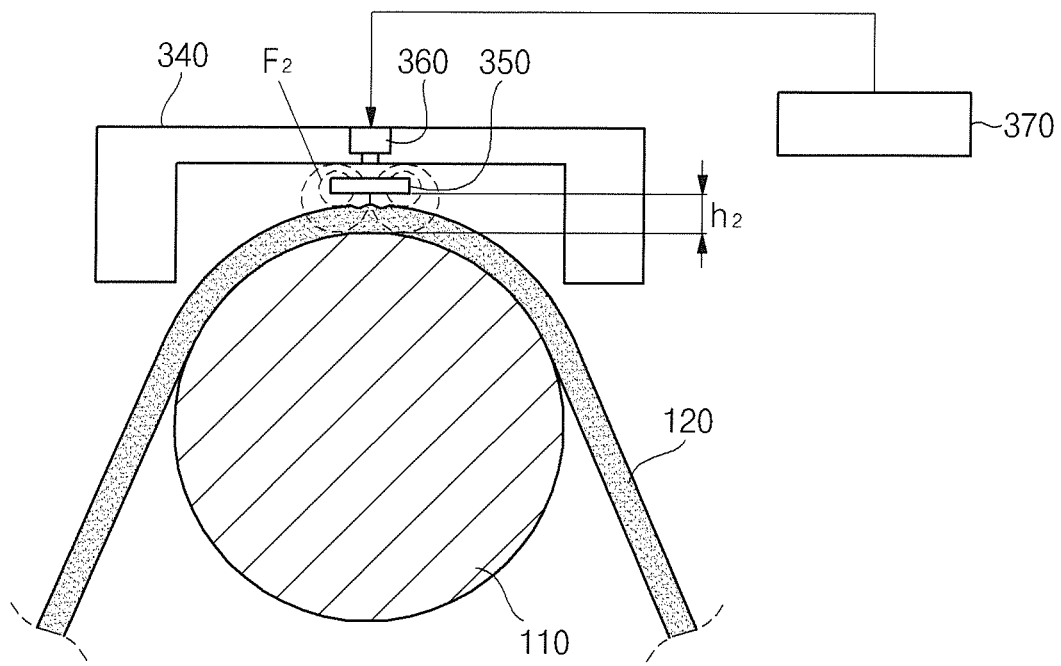
FIG. 6 is a schematic cross-sectional view illustrating a magnetic field between a magnetic member of the web thickness measuring equipment of FIG. 5 and an internal surface of a web, according to an embodiment of the present invention.

FIG. 5 is a schematic cross-sectional view of a web thickness measuring equipment according to another embodiment of the present invention; and FIG. 6 is a schematic cross-sectional view illustrating a magnetic field between a magnetic member of the web thickness measuring equipment of FIG. 5 and an internal surface of a web, according to an embodiment of the present invention.

Referring to FIGS. 5 and 6, a web thickness measuring equipment 300 according to another embodiment of the present invention includes the roller 110, the web 120, a magnetic member 350, a magnetic field detection unit 360, and a processor unit 370. The web thickness measuring equipment 300 shown in FIGS. 5 and 6 detects a change in the thickness of the web 120 wound on the roller 110 and moving in real time. In an embodiment of the web thickness measuring equipment 300 shown in FIGS. 5 and 6, components that are the same as those of the web thickness measuring equipment 100 shown in FIGS. 1 to 3B or the web thickness measuring equipment 200 shown in FIG. 4 are identified by the same reference numerals, and detailed descriptions thereof will not be repeated.

The magnetic member 350 is spaced apart by a distance (e.g., a predetermined distance) from the target external surface of the web 120.

The magnetic field detection unit 360 detects in real time a magnitude of a magnetic field formed between the target internal surface of the web 120 and the magnetic member 350. The magnetic field detection unit 360 may include a Hall sensor disposed to be adjacent to the magnetic member 350 and detecting in real time the magnitude of the magnetic field formed between the magnetic member 350 and the target internal surface of the web 120. That is, the Hall sensor may detect the intensity of the magnetic field formed from the magnetic member 350 such as a magnet and the target internal surface of the web 120. The intensity of the magnetic field may vary according to a distance between the target internal surface of the web 120 and the magnetic member 350. That is, as shown in FIG. 6, as a distance $h_2$ between the target internal surface of the web 120 and the magnetic member 350 is decreased, a magnetic field intensity $F_2$ is decreased, and, in comparison, as shown in FIG. 5, as a distance $h_1$ between the target internal surface of the web 120 and the magnetic member 350 is increased, a magnetic field intensity $F_1$ is increased. The Hall sensor detects the magnetic field intensity between the magnetic member 350 and the target internal surface of the web 120 moving in real time and transmits the detected magnetic field intensity to the processor unit 370. In one embodiment, the magnetic field detection unit 360 may be installed in a transfer frame 340, and the magnetic member 350 may be disposed between the transfer frame 340 and the web 120.

The processor unit 370 may detect a change in the thickness of the web 120 by comparing magnitudes of the magnetic field formed between the magnetic member 350 and the target internal surface of the web 120 moving in real time. That is, the processor unit 370 may detect the change in the thickness of the web 120 from a difference between the magnitudes of the magnetic field formed between the magnetic member 350 and the target internal surface of the web 120 moving in real time.

FIG. 7 is a flowchart illustrating a web thickness measuring method according to another embodiment of the present invention.

Referring to FIG. 7, in order to implement a method of measuring web thickness according to another embodiment of the present invention by detecting displacement amount data of the outer circumferential surface of a roller or the internal surface of the web wound on the roller and displacement amount data of the external surface of the web, the web thickness measuring method may employ the web thickness measuring equipment 100 described above and shown in FIGS. 1 to 3B or the web thickness measuring equipment 200 described above and shown in FIG. 4.

In one embodiment, the web thickness measuring method may include a task (S100) of firstly irradiating light to the outer circumferential surface of the roller; a task (S110) of generating profile data of the outer circumferential surface of the roller according to the light amount distribution of the light having passed through the outer circumferential surface of the roller; a task (S120) of storing the profile data of the outer circumferential surface of the roller; a task (S130) of secondly irradiating light to a target external surface of the web wound around the outer circumferential surface of the roller and moving in real time; a task (S140) of firstly detecting displacement amount data of the target external surface of the web based on the profile data of the outer circumferential surface of the roller according to the light amount distribution of the light having passed through the target external surface of the web; a task (S150) of detecting magnitudes of a magnetic field formed between a magnetic member spaced apart from the target external surface of the web and a target internal surface of the web opposite to the target external surface of the web and secondly detecting displacement amount data of the target internal surface of the web using a magnetic field detection signal of the target internal surface of the web based on the profile data of the outer circumferential surface of the roller; and a task (S160) of obtaining the thickness of the web by comparing the displacement amount data of the target external surface of the web detected in the task (S140) with the displacement amount data of the target internal surface of the web detected in the task (S150).

In one embodiment, the web thickness measuring method may further include a task (S170) of displaying the obtained web thickness, and a task (S180) of generating an alarm signal when the web thickness obtained in the task (S160) exceeds a reference thickness (e.g., a predetermined reference thickness) of the web.

As described above, in the web thickness measuring equipment and method according to embodiments of the present invention, the reliability of measured thickness data is improved by improving uniformity in web thickness measurement by generating profile data of the roller on which the web is wound using optical equipment, and measuring the thickness of the web using the profile data of the web and displacement amount data of the target internal surface of the web moving in real time. In addition, in the web thickness measuring equipment and method according to embodiments of the present invention, a change in the thickness of the web is detected by comparing magnitudes of the magnetic field formed between the magnetic member and the web moving in real time, thereby facilitating real time detection of the web thickness change.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A web thickness measuring equipment comprising:
   a roller that is rotatable and configured to wind a web on the roller and move the web in a rotating direction of the roller;
   a light source that irradiates light to at least one of an outer circumferential surface of the roller and a target external surface of the web;
   a light amount sensor facing the light source, the roller positioned between the light amount sensor and the light source, the light amount sensor configured to detect in real time light amounts of the outer circumferential surface of the roller and the target external surface of the web according to a light amount distribution change of the light irradiated from the light source and having passed through the outer circumferential surface of the roller and the target external surface of the web, respectively;
   a transfer frame on which the light source and the light amount sensor are installed, wherein the transfer frame moves in a lengthwise direction of the roller with respect to the outer circumferential surface of the roller or the target external surface of the web;
   a magnetic member arranged between the transfer frame and the web and being spaced apart from the roller;
   a Hall sensor on the transfer frame configure to detect in real time a magnitude of a magnetic field between a target internal surface of the web and the magnetic member; and a processor receiving information from the light amount sensor and the Hall sensor, wherein the processor is configured to obtain a thickness of the web by generating profile data of the outer circumferential surface of the roller using a light amount detection signal of the outer circumferential surface of the roller, generating displacement amount data of the target external surface of the web moving in real time using a light amount detection signal of the target external surface of the web, generating displacement amount data of the target internal surface of the web using a magnetic field detection signal of the target internal surface of the web, and comparing the displacement amount data of the target external surface of the web with the displacement amount data of the target internal surface of the web.

2. The web thickness measuring equipment of claim 1, wherein the processor detects a change in the thickness of the web by comparing magnitudes of the magnetic field detected in real time by the Hall sensor.

3. The web thickness measuring equipment of claim 1, wherein the processor comprises a memory that stores the profile data of the outer circumferential surface of the roller, receives the profile data of the outer circumferential surface of the roller from the memory, and generates the displacement amount data of the target external surface of the web and the displacement amount data of the target internal surface of the web based on the profile data of the outer circumferential surface of the roller.

4. The web thickness measuring equipment of claim 1, wherein the processor comprises:
an operator that obtains the thickness of the web;
a display that displays the thickness of the web obtained by the operator to a user of the web thickness measuring equipment;
an alarm generator that generates an alarm signal when the thickness of the web obtained by the operator exceeds a reference thickness;
a driving controller that controls rotation and movement of the roller, movement of the web, and driving of the detector; and
a main controller that controls operations of the memory, the operator, the display, the alarm generator, and the driving controller.

5. The web thickness measuring equipment of claim 1, wherein the profile data of the outer circumferential surface of the roller include position coordinate values of an entire outer circumferential surface of the roller.

6. The web thickness measuring equipment of claim 5, wherein the displacement amount data of the target external surface of the web include position coordinate values of the target external surface of the web obtained based on the profile data of the outer circumferential surface of the roller, corresponding to the target external surface of the web.

7. The web thickness measuring equipment of claim 5, wherein the displacement amount data of the target internal surface of the web include position coordinate values of the target internal surface of the web obtained based on the profile data of the outer circumferential surface of the roller, corresponding to the target internal surface of the web.

8. A web thickness measuring equipment comprising:
a roller that is rotatable and configured to wind a web on the roller and move the web in a rotating direction of the roller;
a light source that irradiates light to at least one of an outer circumferential surface of the roller and a target external surface of the web;
an image acquisition sensor facing the light source, the roller positioned between the image acquisition sensor and the light source, the image acquisition sensor configured to detect the light irradiated from the light source and having passed through the outer circumferential surface of the roller and the external surface of the web, and to detect in real time images of the outer circumferential surface of the roller and the external surface of the web;
a transfer frame on which the light source and the image acquisition sensor are installed, wherein the transfer frame moves in a lengthwise direction of the roller with respect to the outer circumferential surface of the roller or the target external surface of the web;
a magnetic member arranged between the transfer frame and the web and being spaced apart from the roller;
a Hall sensor on the transfer frame configure to detect in real time a magnitude of a magnetic field between the target internal surface of the web and the magnetic member; and
a processor receiving information from the light amount sensor and the Hall sensor, wherein the processor is configured to obtain a thickness of the web by generating profile data of the outer circumferential surface of the roller using an image detection signal of the outer circumferential surface of the roller, generating displacement amount data of the target external surface of the web moving in real time using an image detection signal of the target external surface of the web, generating displacement amount data of the target internal surface of the web using a magnetic field detection signal of the target internal surface of the web, and comparing the displacement amount data of the target external surface of the web with the displacement amount data of the target internal surface of the web.

9. The web thickness measuring equipment of claim 8, wherein the processor detects a change in the thickness of the web by comparing magnitudes of the magnetic field detected in real time by the Hall sensor.

10. The web thickness measuring equipment of claim 8, wherein the profile data of the outer circumferential surface of the roller include position coordinate values of an entire outer circumferential surface of the roller.

11. The web thickness measuring equipment of claim 10, wherein the displacement amount data of the target external surface of the web include position coordinate values of the target external surface of the web obtained based on the profile data of the outer circumferential surface of the roller, corresponding to the target external surface of the web.

12. The web thickness measuring equipment of claim 10, wherein the displacement amount data of the target internal surface of the web include position coordinate values of the target internal surface of the web obtained based on the profile data of the outer circumferential surface of the roller, corresponding to the target internal surface of the web.

13. A method of measuring a thickness of a web, the method comprising:
firstly irradiating light to an outer circumferential surface of a roller;
generating profile data of the outer circumferential surface of the roller according to a light amount distribution of the light having passed through the outer circumferential surface of the roller;
storing the profile data of the outer circumferential surface of the roller;

secondly irradiating light to a target external surface of the web wound around the outer circumferential surface of the roller and moving in real time;

firstly detecting displacement amount data of the target external surface of the web based on the profile data of the outer circumferential surface of the roller according to a light amount distribution of the secondly irradiated light having passed through the target external surface of the web;

detecting magnitudes of a magnetic field formed between a target internal surface of the web and a magnetic member that is spaced apart from the target external surface of the web, the target internal surface of the web being opposite to the target external surface of the web, and secondly detecting displacement amount data of the target internal surface using a magnetic field detection signal of the target internal surface based on the profile data of the outer circumferential surface of the roller; and obtaining the thickness of the web by comparing the displacement amount data of the target external surface of the web with the displacement amount data of the target internal surface.

14. The method of claim 13, further comprising:

displaying the thickness of the web; and generating an alarm signal when the thickness of the web exceeds a reference thickness.

\* \* \* \* \*